United States Patent
Colombo et al.

(10) Patent No.: US 7,272,195 B2
(45) Date of Patent: Sep. 18, 2007

(54) METHOD AND CIRCUIT FOR CONTROLLING THE PEAK POWER OF A FILTERED SIGNAL IN A SINGLE CARRIER DATA TRANSMISSION SYSTEM

(75) Inventors: Alessandro Colombo, Carate Brianza (IT); Arnaldo Spalvieri, Milan (IT); Roberto Valtolina, Trezzo sull'Adda (IT)

(73) Assignee: Alcatel, Paris (FR)

( * ) Notice: Subject to any disclaimer, the term of this patent is extended or adjusted under 35 U.S.C. 154(b) by 748 days.

(21) Appl. No.: 10/695,768

(22) Filed: Oct. 30, 2003

(65) Prior Publication Data

US 2004/0123224 A1 Jun. 24, 2004

(30) Foreign Application Priority Data

Oct. 31, 2002 (EP) .................................. 02292720

(51) Int. Cl.
*H04K 1/02* (2006.01)
*H04L 25/03* (2006.01)
*H04L 25/49* (2006.01)

(52) U.S. Cl. ...................... 375/296; 375/229; 375/265; 714/752; 714/782

(58) Field of Classification Search ................ 375/295, 375/296, 229, 265; 714/752, 792, 781, 782
See application file for complete search history.

(56) References Cited

U.S. PATENT DOCUMENTS 6,201,836 B1 * 3/2001 Kim ........................... 375/265

FOREIGN PATENT DOCUMENTS

GB 2263849 A 8/1993

OTHER PUBLICATIONS

Spalvieri et al, "Codes for the peak power constrained channel" IEEE Global Telecommunications Conference, Nov. 14-16, 1995, pp. 639-643 XP000621561.

Luise De Gaudenzi, "Trellis-coded 16-QAM transmission over a nonlinear satellite channel", International Conference on Communications, May 23-26, 1993, pp. 1723-1727, XP000448420.

* cited by examiner

*Primary Examiner*—Phuong Phu
(74) *Attorney, Agent, or Firm*—Sughrue Mion, PLLC

(57) ABSTRACT

Disclosed is a method for controlling the peak power of a filtered signal in a single carrier data transmission system. The method comprises the steps of receiving a digital sequence (13) from a data source; generating a new digital sequence (a(k)); shaping filtering (34) the new digital sequence (a(k)) and producing a filtered digital sequence (y(k)) Characterized in that the step of generating a new digital sequence (a(k)) comprises the steps of: encoding data by an algebraic error correcting code (28); and performing a bit modification (30) by deliberately adding errors in such a way that the peak power of the filter signal affected by the deliberately introduced errors is lower than the peak power of the signal unaffected by errors. Disclosed is also a circuit for performing the method.

5 Claims, 2 Drawing Sheets

METHOD AND CIRCUIT FOR CONTROLLING THE PEAK POWER OF A FILTERED SIGNAL IN A SINGLE CARRIER DATA TRANSMISSION SYSTEM

BACKGROUND OF THE INVENTION

The present invention relates to the field of transmitting and receiving digital signals over a radio link. In particular, it relates to a method and circuit for properly controlling the peak power of a filtered signal in a single carrier data transmission system.

In order to make efficient use of the microwave radio spectrum, state-of-art digital radio systems employ highly bandwidth-efficient modulation techniques. Today, several commercial systems employ a 128 QAM signal constellation and some 512 QAM prototypes are currently being field-tested.

Moreover, adjacent channel interference specifications require the use of tightly band limited signaling formats: to comply with these requirements, pulse shapes with very small roll-off factor are usually used. Unfortunately, these pulse shapes result in a substantial increase of the PAR (peak to average power ratio).

As the number of the points of the signal constellation grows, the system becomes more and more sensitive to all types of linear and nonlinear signal distortion. A particularly critical issue in bandwidth-efficient QAM systems is the non-linearity of the high power amplifier (HPA) used at the transmitter. A non-linear HPA results in self interference and, due to the growth of the transmitted spectrum out of the band allocated to the transmitted signal, in adjacent channel interference.

In principle, the effect of HPA non-linearity could be reduced by backing-off the output signal level from the amplifier saturation point. Unfortunately, this reduces the transmitted signal power and, consequently, the radio link flat-fade margin. Moreover, the HPA back-off has to be increased when pulse shapes with small roll-off factor are used.

To increase the fade margin, the HPA must be driven as close to its saturation point as possible. Thus, amplifier efficiency can be increased by using a signal with a lower ratio of peak-to-average power (and, of course, with the same bandwidth efficiency). At the present the problem of reducing the peak-to-average power ratio is faded in one of the following four ways.

The first way consists in using "shaping" constellation techniques in order to reduce the ratio between the peak power and the average power of the unfiltered signal. Such techniques are disclosed, for instance, in G. David Formey, "Trellis Shaping", *IEEE Trans. Inform. Theory*, vol. 38, no. 2, pages 281-300, March 1992.

Such a solution provides, under certain circumstances, unsatisfactory performances. In particular it is not able to remarkably reduce the peak power of the filtered signal and thus does not increase the efficiency of HPA's.

The second possibility consists in providing analog signal predistortion. In other words, a non-linear circuit having a characteristic inverse to the one of the HPA is inserted in the path of the analog signal.

Such a second arrangement is not able to realize exactly the inverse characteristic of the HPA. Moreover, this response may vary with temperature and aging.

The third arrangement consists in performing channel equalization and non-linear cancellation of Inter Symbol Interference (ISI), namely the receiving equalizer tries to cancel the interference connected with non-linearity.

The main disadvantage of this third solution is that it does not operate out of band emission. Moreover, with small values of the roll-off factor, it would require very complex equalizers.

Finally, the last known solution to the above problem is providing codes to control the peak power of the filtered signal at the amplifier input. This solution is disclosed in A. Spalvieri, A. Sandri, D. Mapelli, "Codes for the peak power constrained channel", GLOBECOM 1995, IEEE, Vol. 1, pages 639-643. The basic idea under such a solution is avoiding transmission of sequences having an associated high peak power of the filtered signal, and replacing them by more suitable ones namely by sequences with a lower power of the filtered signal. The possibility of carrying out this replacement is given by the increasing of the dimension of the alphabet of the transmitted points. Of course, in reception, the unwanted sequences, suppressed in transmission, are reconstructed in their original form.

Also this last solution has disadvantages, as it requires very complex codes in order to achieve significant gains.

SUMMARY OF THE INVENTION

In view of the disadvantages of the known solutions, the object of the present invention is to provide a base-band method and circuit effectively reducing the peak power of the filtered signal, namely the signal at the input of the HPA, so that the PAR could be reduced. The method and circuit of the invention do not result in the disadvantages of the prior-art solutions.

This and further objects are obtained by a method and circuit according to claims 1 and 5, respectively. The respective dependent claims set forth further advantageous characteristics of the present invention. All the claims are intended to be an integral portion of the present description.

The basic idea of the present invention is based upon the possibility of avoiding transmission of sequences having an associated high peak power of the filtered signal. Conveniently such high peak power sequences are replaced by more suitable ones, namely by sequences with a lower power of the filtered signal. According to the present invention, data are encoded by an algebraic error correcting code and errors are deliberately added at the transmission side for lowering the peak power. At the receiving side, the errors are eliminated by conventional algebraic decoding techniques. In other words, at the transmission side, the sequences of symbols originating too high peaks are eliminated.

BRIEF DESCRIPTION OF THE DRAWINGS

The present invention will become fully clear from the following detailed description of a preferred embodiment thereof, given by way of non limiting example and to be read having reference to the attached sheets of drawings, wherein.

DETAILED DESCRIPTION OF THE INVENTION

The method and circuit according to the present invention could be considered similar to the above described forth possible arrangement (providing codes to control the peak power of the filtered signal at the amplifier input) for reducing PAR. As said above, the basic idea of the present invention consists in detecting signal sequences having a high peak power of the filtered signal associated thereto and in avoiding the transmission of such high-peak power sequences that are replaced by properly reduced peak power sequences.

In contrast to the above known similar solution, according to the present invention, the possibility of carrying out this replacement is given by encoding data by an algebraic error correcting code, and to deliberately add errors at the transmission side, in such a way that the peak power of the filtered signal affected by the deliberately introduced errors is lower than the peak power of the signal unaffected by errors. Finally, the errors are cancelled at the receiving side by conventional algebraic decoding techniques.

According to the invention, all the other conditions, such as minimum distance between transmitted points and average transmitted power are unchanged.

Figure 1:
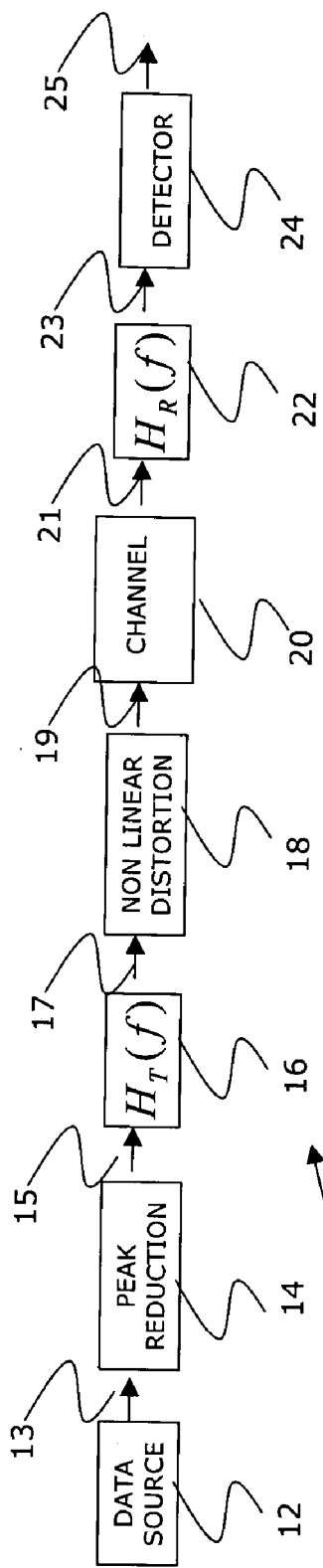
FIG. 1 illustrates a schematic block diagram of a generic digital transmission system, in which a novel peak reduction block, which is the subject of the present invention, has been inserted.
Figure 4:
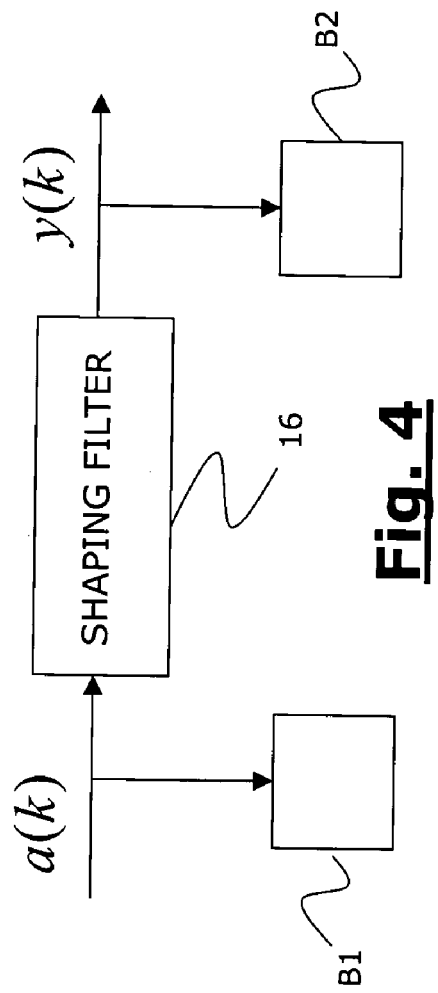
FIG. 4 shows a possible arrangement of the bit modification according to the present invention.

FIG. 1 illustrates a schematic block diagram of a generic digital transmission system 10, in which a novel PEAK REDUCTION block 14, which is the subject of this invention, is inserted. Block 10 eliminates the unwanted sequences from the signal to be transmitted.

With further reference to FIG. 1, in the system 10 a DATA SOURCE 12 outputs a digital sequence to be transmitted. A transmission shaping filter $H_T(f)$ 16 provides at its output the analog signal to be transmitted. A NON LINEAR DISTORTION block 18 (which could be a HPA, for instance) represents an unwanted nonlinear distortion in the signal path. Said distortion can be due to the non-linear characteristic of the HPA or, more generally, to a non-linear behavior of the linear transmission channel 20. At the receiving side, a receive filter $H_R(f)$ 22 receives the signal from the transmission channel and carries out a suitable filtering. Finally, a DETECTOR block 24 properly recovers the transmitted data.

In an advantageous and therefore preferred embodiment, the PEAK REDUCTION block 14 in accordance with the invention is realized in the form of digital encoder.

Figure 2:
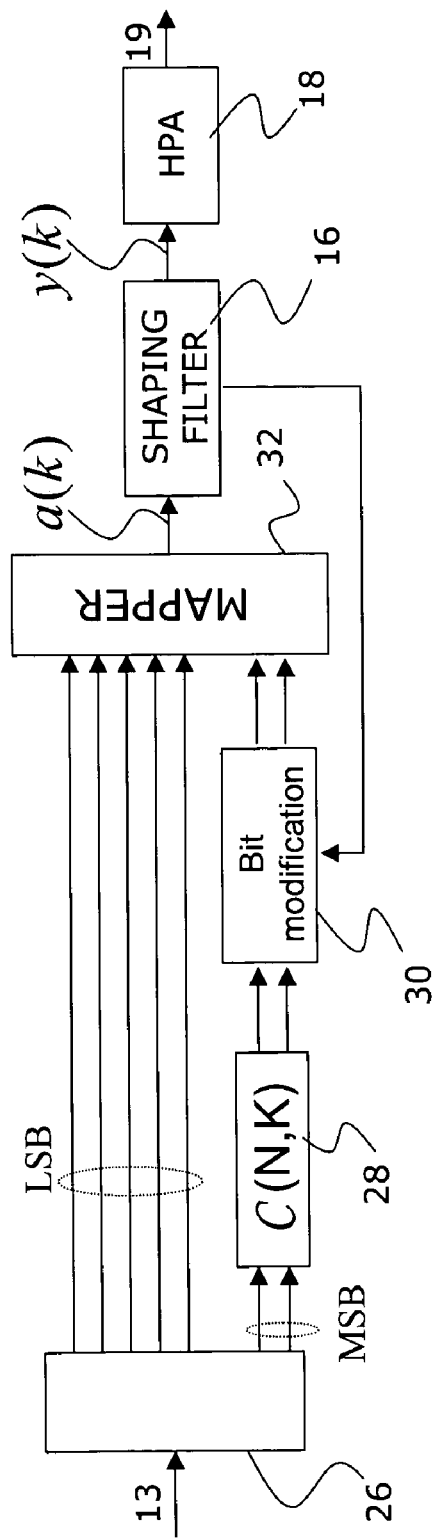
FIG. 2 shows a block diagram illustrating a possible exemplifying embodiment of the peak reduction block in case of a radio relay system transmission using a signal mapping.

As a non limiting example, FIG. 2 show a block diagram illustrating how it is possible to implement the PEAK REDUCTION block 14 in a case of a radio relay system transmission using a signal mapping as, e.g., PSK, QAM or, more generally, AM/PM modulation.

Block 14 receives at its input the bits 13 to be transmitted. The bits 13 are subject to a serial to parallel conversion by block 26. The low significative bits LSB are sent to a mapper 32. The most significative bits MSB are sent to an encoder 28 encoding the most significant bits of the constellation symbol by using an algebraic (N, K) code. A BIT MODIFICATION block 30 performs a proper and deliberated modification of the bits.

Figure 3:
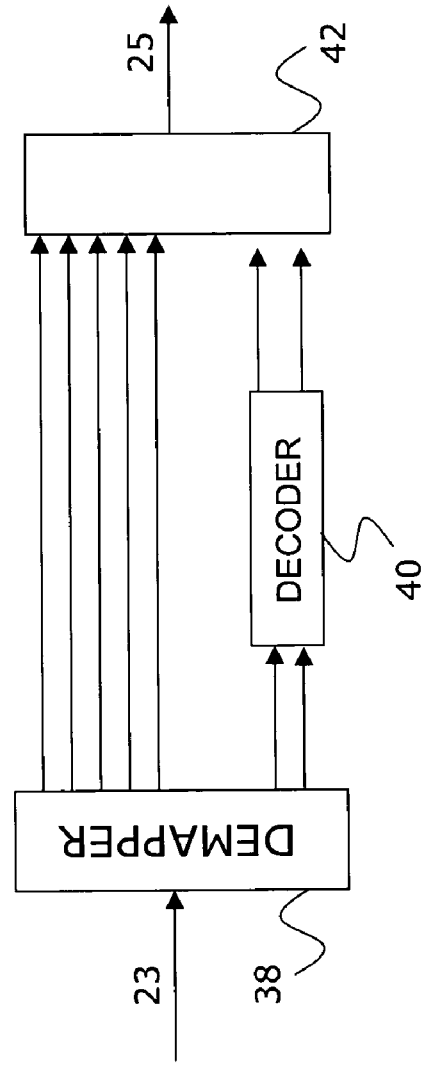
FIG. 3 shows a block diagram illustrating a possible exemplifying embodiment of the detector block.

FIG. 3 shows the DETECTOR block 24. It comprises a demapper 38, a decoder 40 and a parallel-to-serial converter 42.

The mapper block 32 implements the so called "natural mapping"; for example, let's consider as alphabet of the source the 16×16 square constellation and let $\{a(k)\}$ denote the sequence of the 256 QAM source symbols. If this constellation is scaled so that the minimum distance between adjacent points $d_{min}=1$, then each coordinate takes on values from the 16-point QAM constellation $\{\pm 1/2, \pm 3/2, \ldots, \pm 15/2\}$. In two's-complement notation, the value of a coordinate is denoted by "zabc.1", where zabc represents any binary 4-tuple. The most significant bit (MSB), z, is the sign bit. The remaining bits, abc, will be called the less significant bit (LSB). These bits can be encoded by traditional error correction schemes, such as Ungerboeck codes or multilevel codes.

It should be noted that with such a mapping the two MSB's (four possible values) select the quadrant of the constellation.

The present invention consists in encoding with an algebraic (N, K) code the most significant bits of the constellation symbol (in FIG. 2a the first two MSB's are coded). For example, a BCH(N,K) code can be profitably used.

The decoder 40 is able to correct t errors in a block of N received bits (the value of t depends on N, K and on the specific code). At the transmission side it is deliberately possible to modify the value of t bits by BIT MODIFICATION block 30 as the decoder 40 at the receiving side will correct them. The bits are properly modified in order to reduce the peak power of the filtered signal y(k). Considering only the errors due to the linear AWGN (Additive White Gaussian Noise) channel, it should be noted that, when the error probability of the MSBs is negligible with respect to the error probability of the remaining bits, the deliberately introduced errors do not cause any increase in the bit error probability and hence the system gain is not reduced.

The bit modification can be arranged as follows (see FIG. 3).

Suppose that the transmission filter 16 produces m output samples at each symbol repetition interval (with m integer) and construct from the source sequence $\{a(k)\}$ a new sequence $\{a'(k)\}$ by inserting m−1 zeros between each couple of source symbols. The k-th samples at the output of the TX filter is $$y(k) = \sum_j a'_j h_{k-j}$$

being $h_j$ the coefficient of the filter.

The source sequence $\{a(k)\}$ and the output sequence $\{y(k)\}$ of the SHAPING FILTER 34 are stored respectively in a buffer B1 of N samples and in a buffer B2 of M samples (note that M=mN); the index r of buffer B2 in correspondence of the maximum of $|y(j)|j=1, \ldots, M$ is found. Properly changing the value of a(k) it is possible to obtain a value of y(r) (of course inside the block of length M) that is lower than before. Specifically, we construct six tentative symbols sequences by three changes of the two MSB of a(k) for $\bar{k}=int[r/m]$ and for $\bar{k}+1$. Then the peak of each of the six filtered sequences is computed, and the tentative that gives rise to the filtered sequence with lower peak is taken. Then, if the peak of said tentative is greater than y(r), the modification is rejected and the sequence $\{y(k)\}$ is transmitted, elsewhere the modification is accepted and the procedure is repeated until either t bit modification are introduced or a rejected modification is found.

Of course every time that the peak is evaluated, a new filtering has to be performed; this may be computationally very expensive but it should be noted that due to the linear nature of the modification and of the filtering, only the effect of the modification can be computed and added to the original filtered sequence {y(k)}.

Thus, briefly, the method according to the present invention comprises the steps of receiving a digital sequence 13 from a data source; generating a new digital sequence a(k); shaping filtering 34 the new digital sequence a(k) and producing a filtered digital sequence y(k). The method is characterized in that the step of generating a new digital sequence a(k) comprises the steps of: encoding data by an algebraic error correcting code 28; and performing a bit modification 30 by deliberately adding errors in such a way that the peak power of the filter signal affected by the deliberately introduced errors is lower than the peak power of the signal unaffected by errors.

There have thus been shown and described a novel method and a novel circuit which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the scope of the invention are deemed to be covered by the invention which is limited only by the claims which follow.

The invention claimed is:

1. A method for controlling the peak power of a filtered signal in a single carrier data transmission system, the method comprising the steps of receiving a digital sequence (13) from a data source; generating a new digital sequence (a(k)); shaping filtering (34) the new digital sequence (a(k)) and producing a filtered digital sequence (y(k)), characterized in that the step of generating a new digital sequence (a(k)) comprises the steps of:

encoding data using a BCH (N,K) code; and performing a bit modification (30) by deliberately adding errors in such a way that the peak power of the filter signal affected by the deliberately introduced errors is lower than the peak power of the signal unaffected by errors.

2. A method according to claim 1, characterized by the step of cancelling the deliberately added errors at the receive side by adopting proper algebraic decoding techniques.

3. A method according to claim 1, characterized in that said encoding step comprises the step of encoding by said BCH (N, K) code the most significant bits (MSB) of the constellation symbol, the less significant bits (LSB) being sent directly to a mapper.

4. A circuit for controlling the peak power of a filtered signal in a single carrier data transmission system, the circuit comprising means for receiving a digital sequence (13) from a data source; means for generating a new digital sequence (a(k)); a shaping filter (34) for filtering the new digital sequence (a(k)) and producing a filtered digital sequence (y(k)), characterized in that the means for generating a new digital sequence (a(k)) comprise:

an encoder (28) for encoding data using a BCH (N,K) code; and means (30) for performing a bit modification by deliberately adding errors in such a way that the peak power of the filter signal affected by the deliberately introduced errors is lower than the peak power of the signal unaffected by errors.

5. A circuit according to claim 4, characterized in that the encoder (28) encodes, by said BCH (N,K) code, the most significant bits (MSB) of the constellation symbol, the less significant bits (LSB) being sent directly to a mapper.

* * * * *